United States Patent
Ko et al.

(10) Patent No.: US 9,030,952 B2
(45) Date of Patent: May 12, 2015

(54) APPARATUS AND METHOD FOR PRECODING BY LIMITED COOPERATION IN A WIRELESS COMMUNICATION SYSTEM

(75) Inventors: Eun-Seok Ko, Gyeonggi-do (KR); Chung-Yong Lee, Seoul (KR); Myoung-Seok Kim, Seoul (KR); Mi-Sun Yoon, Seoul (KR); Yung-Soo Kim, Gyeonggi-do (KR); June Moon, Gyeonggi-do (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 303 days.

(21) Appl. No.: 13/362,971

(22) Filed: Jan. 31, 2012

(65) Prior Publication Data

US 2012/0195219 A1    Aug. 2, 2012

(30) Foreign Application Priority Data

Jan. 31, 2011    (KR) .......................... 10-2011-0009290

(51) Int. Cl.
*H04L 12/26* (2006.01)
*H04W 72/04* (2009.01)
*H04B 7/04* (2006.01)
*H04W 72/08* (2009.01)

(52) U.S. Cl.
CPC ......... *H04W 72/0433* (2013.01); *H04B 7/0413* (2013.01); *H04W 72/082* (2013.01)

(58) Field of Classification Search
CPC ... H04W 24/00; H04L 43/50; H04L 43/0852; H04L 43/08; H04B 17/003
USPC .................. 370/252, 241, 251, 245, 243, 246
See application file for complete search history.

(56) References Cited

U.S. PATENT DOCUMENTS

| | | | | |
|---|---|---|---|---|
| 2003/0054825 | A1* | 3/2003 | Chen et al. ..................... | 455/442 |
| 2009/0154419 | A1* | 6/2009 | Yoshida et al. ............... | 370/330 |
| 2009/0323773 | A1* | 12/2009 | Bala et al. ..................... | 375/141 |
| 2010/0177697 | A1* | 7/2010 | Tanno et al. .................. | 370/328 |
| 2010/0254276 | A1* | 10/2010 | Nishikawa et al. ........... | 370/252 |
| 2010/0322185 | A1* | 12/2010 | Park et al. ..................... | 370/331 |
| 2011/0149877 | A1* | 6/2011 | Hafeez .......................... | 370/329 |

* cited by examiner

*Primary Examiner* — Hassan Phillips
*Assistant Examiner* — Siren Wei
(74) *Attorney, Agent, or Firm* — The Farrell Law Firm, P.C.

(57) ABSTRACT

An apparatus and method are provided for precoding by limited cooperation in a wireless communication system. A method of data precoding by a Base Station (BS) in a wireless communication system includes determining a Channel Quality Indicator (CQI) parameter indicating channel size information between the BS and a User Equipment (UE) served by the BS; transmitting the determined CQI parameter through a backhaul to a central unit; receiving, from the central unit, a weight factor based on a CQI parameter from each cell; and determining a precoding vector based on the weight factor. The weight factor represents a relative ratio of an inter-cell environment that is to be interfered by the BS.

14 Claims, 8 Drawing Sheets

APPARATUS AND METHOD FOR PRECODING BY LIMITED COOPERATION IN A WIRELESS COMMUNICATION SYSTEM

PRIORITY

This application claims priority under 35 U.S.C. §119 to an application filed in the Korean Intellectual Property Office on Jan. 31, 2011 and assigned Serial No. 10-2011-0009290, the entire content of which is incorporated herein by reference.

BACKGROUND OF THE INVENTION

1. Field of the Invention

The present invention relates generally to an apparatus and method for precoding in a wireless communication system, and in particular, to an apparatus and method for precoding by limited cooperation in a wireless communication system.

2. Description of the Related Art

In a multi-cell environment, a User Equipment (UE) located at a cell boundary simultaneously receives signals from its own cell, i.e., a serving cell, and from an adjacent cell. The signal received from the adjacent cell acts as an interference with the UE, thus degrading the performance of the UE.

Therefore, research is conducted on various precoding schemes for efficiently controlling such interference. Typical examples of the precoding schemes include a Maximum Ratio Transmission (MRT) scheme, an Interference Minimizing Transmission (IMT) scheme, and a Signal-to-Leakage-plus-Noise Ratio (SLNR) maximization scheme.

The MRT scheme transmits signals by forming beams according to the channel of a UE supported by each cell. The MRT scheme maximizes a reception (RX) Signal-to-Noise Ratio (SNR) of a UE supported by each cell, without considering possible interference with another cell. However, because each cell transmits signals by considering only the relationship with a UE supported by the cell, without considering the communication environment of another cell, the MRT scheme cannot control interference from an adjacent cell to a UE located in another cell with a poor environment, thus degrading the performance of the UE.

The IMT scheme transmits signals while minimizing possible interference from each cell to another cell. In the IMT scheme, each cell collects channel information about all UEs supported by the cell, generates an aggregate interfered channel matrix, and uses a singular vector corresponding to the minimum singular value as a precoding vector through singular value decomposition, thereby minimizing a possible interference with another UE. In this manner, the IMT scheme controls interference with another cell, rather than providing smooth communication in each cell. Therefore, a UE located in another cell with a poor environment has a reduced interference from an adjacent cell, thus having an improved performance. However, a UE located in a cell with a good environment cannot receive more data due to a precoding vector set to reduce interference (can otherwise receive more data), thus having a degraded performance.

The SLNR maximization scheme is a favorable combination of the MRT scheme and the IMT scheme. The SLNR maximization scheme transmits signals by forming beams according to the channel of a UE supported by each cell, while minimizing al possible interference from each cell to another cell. Herein, the SLNR is a ratio of the size of a transmission (TX) signal to a sum of the size of interference (leakage) from the TX signal to another cell and the size of a noise. That is, the SLNR maximization scheme maximizes an SLNR to secure the quality of a TX signal and the performance of a UE in another cell. However, the SLNR maximization scheme fails to reflect the practical communication environments of other cells because each cell sets a precoding vector by considering only the channel of possible interference with another cell.

For example, assuming that there are three cells, where first, second, and third Base Stations (BSs) transmit signals to respective first, second, and third UEs, a channel between the first BS and the second UE and a channel between the first BS and the third UE are in the same state, and the communication environment of the third BS is poorer than the communication environment of the second BS, because the first BS causes large interference to the second UE, the first BS sets a precoding vector by considering the second UE more than the third UE.

However, in this example, the second BS is not greatly affected by interference because of its good communication environment, while the third BS is greatly affected by even a small interference because of its poor communication environment. Thus, the precoding vector set by the first BS fails to effectively control interference with another cell. Also, because the conventional SLNR maximization scheme considers only two cells, it is an inefficient interference control scheme in an environment where there are three or more cells.

SUMMARY OF THE INVENTION

The present invention is to substantially solve at least the above-described problems and/or disadvantages and to provide at least the advantages described below.

Accordingly, an aspect of the present invention is to provide an apparatus and method for precoding by limited cooperation in a wireless communication system.

Another aspect of the present invention is to provide an apparatus and method for sharing information indicating a quality of a communication environment of each cell (e.g., channel size information) through limited inter-cell cooperation in a wireless communication system and determining a cell-by-cell weight factor for determining a precoding vector on the basis of the information.

Another aspect of the present invention is to provide an apparatus and method for controlling interference with a UE having a good channel environment and interference with a UE having a poor channel environment in a wireless communication system to improve the performance of the UE with a poor channel environment.

In accordance with an aspect of the present invention, a method of data precoding is provided for a Base Station (BS) in a wireless communication system. The method includes determining a Channel Quality Indicator (CQI) parameter indicating channel size information between the BS and a User Equipment (UE) served by the BS; transmitting the determined CQI parameter through a backhaul to a central unit; receiving, from the central unit, a weight factor based on a CQI parameter from each cell; and determining a precoding vector based on the weight factor. The weight factor represents a relative ratio of an inter-cell environment that is to be interfered by the BS.

In accordance with an aspect of the present invention, a method of data precoding is provided for a central unit in a wireless communication system. The method includes receiving a Channel Quality Indicator (CQI) parameter through a backhaul from each cell in the wireless communication system; determining a cell-by-cell weight factor based on the received CQI parameters from each cell; and transmitting the cell-by-cell weight factor through a backhaul to a relevant cell. The weight factor represents a relative ratio of an inter-cell environment that is to be interfered by each cell.

In accordance with an aspect of the present invention, a method of data precoding is provided for a User Equipment (UE) in a wireless communication system. The method includes transmitting a reference signal to a serving Base Station (BS); and receiving precoding data from the serving BS.

In accordance with an aspect of the present invention, an apparatus of a Base Station (BS) is provided for data precoding in a wireless communication system. The apparatus includes a Channel Quality Indicator (CQI) parameter determining unit for determining a CQI parameter indicating channel size information between the BS and a User Equipment (UE) served by the BS; a backhaul communicating unit for transmitting the CQI parameter through a backhaul to a central unit, and receiving, from the central unit, a weight factor based on a CQI parameter from each cell; and a precoding vector determining unit for determining a precoding vector based on the weight factor. The weight factor represents a relative ratio of an inter-cell environment that is to be interfered by the BS.

In accordance with an aspect of the present invention, an apparatus of a central unit is provided for data precoding in a wireless communication system. The apparatus includes a backhaul communicating unit for receiving a Channel Quality Indicator (CQI) parameter through a backhaul from each cell, and transmitting a determined cell-by-cell weight factor through the backhaul to a relevant cell; and a weight factor determining unit for determining the cell-by-cell weight factor based on the received CQI parameters. The weight factor represents a relative ratio of an inter-cell environment that is to be interfered by each cell.

In accordance with an aspect of the present invention, an apparatus of a User Equipment (UE) is provided for data precoding in a wireless communication system. The apparatus includes a communication module for transmitting a reference signal to a serving Base Station (BS), and receiving precoding data from the serving BS; and a control unit for controlling an overall operation of the UE

BRIEF DESCRIPTION OF THE DRAWINGS

The above and other aspects, features, and advantages of certain embodiments of the present invention will become more apparent from the following detailed description when taken in conjunction with the accompanying drawings, in which.

DETAILED DESCRIPTION OF EMBODIMENTS OF THE INVENTION

Various embodiments of the present invention will be described herein below with reference to the accompanying drawings. In the following description, detailed descriptions of well-known functions or configurations will be omitted to avoid obscuring the subject matter of the present invention in unnecessary detail. Also, the terms used herein are defined according to the functions of the embodiments of the present invention. Thus, the terms may vary depending on user or operator intentions or practices.

In accordance with an embodiment of the present invention, precoding scheme is provided by limited inter-cell cooperation in a wireless communication system. In particular, the scheme shares information indicating the quality of a communication environment of each cell (e.g., channel size information) through limited inter-cell cooperation in a wireless communication system and determines a cell-by-cell weight factor for determining a precoding vector on the basis of the information.

Figure 1:
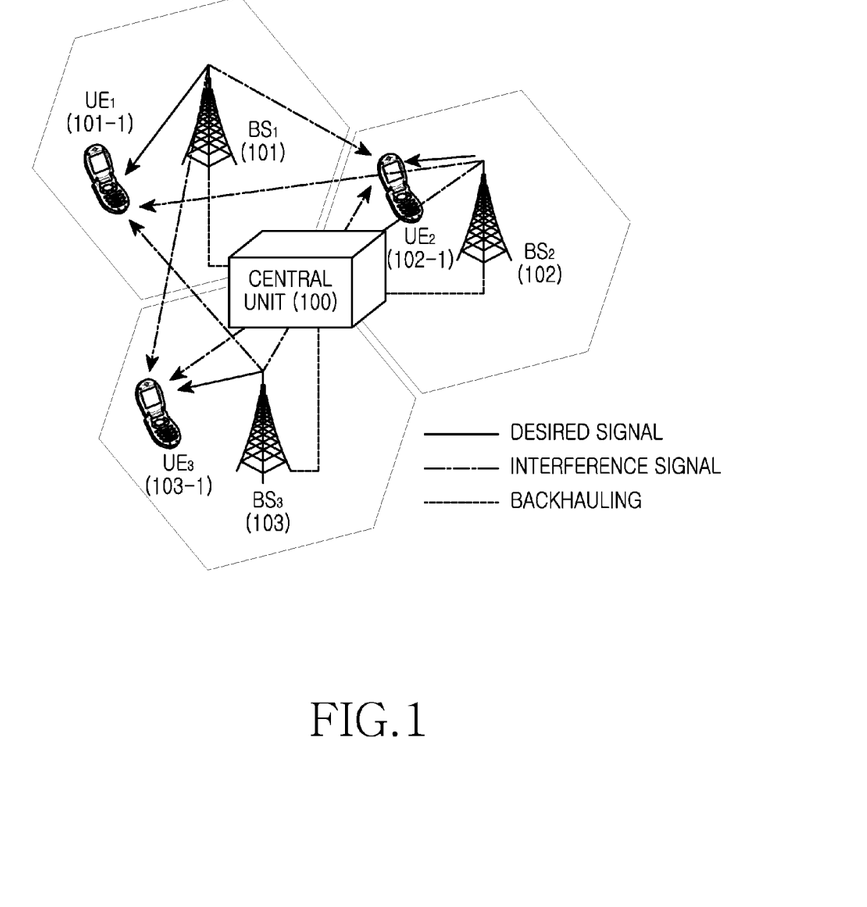
FIG. 1 illustrates a wireless communication system environment according to an embodiment of the present invention.

FIG. 1 illustrates a wireless communication system environment considered according to an embodiment of the present invention.

Referring to FIG. 1, inter-cell interference occurs when several cells are adjacent to each other in a multi-cell environment. For example, in FIG. 1, there are three adjacent cells, i.e., a first BS 101, a second 102, and a third BS 103, which transmit signals respectively to a first UE 101-1, a second UE 102-1, and a third UE 103-1. Conventionally, the signal transmitted from the first BS 101 to the first UE 101-1 interferes with the second UE 102-1 and the third UE 103-1, the signal transmitted from the second BS 102 to the second UE 102-1 interferes with the first UE 101-1 and the third UE 103-1, and the signal transmitted from the third BS 103 to the third UE 103-1 interferes with the first UE 101-1 and the second UE 102-1.

However, in accordance with an embodiment of the present invention, a precoding scheme is provided by limited inter-cell cooperation in order to efficiently control inter-cell interference in the multi-cell environment, wherein backhauling and a central unit 100 are used for limited inter-cell cooperation. That is, each cell transmits information indicating its communication environment quality (e.g., channel size information) through the backhaul to the central unit 100, and the central unit 100 determines a cell-by-cell weight factor for determining a precoding vector based on the received information and transmits the determined cell-by-cell weight factor through the backhaul to each of the cells. Herein, the weight factor represents a relative ratio of an inter-cell environment that will be interfered by each BS. Advantageously, this precoding scheme can control interference for a UE with a good communication environment and interference for a UE with a poor communication environment, thereby improving the performance of the UE with a poor communication environment.

For ease of description, it is assumed herein that a wireless communication system is capable of multi-cell cooperation based on Time Division Duplex (TDD). Accordingly each BS can know the channel states between the BS and all relevant UEs based on the TDD channel reciprocity, even without feedback information from the UEs.

When a BS i transmits data to a UE i supported by the BS i in an environment where there are L cells, the transmitted data acts as interference with another UE. Here, it is assumed that each BS has Ni antennas and each UE has one antenna. In this case, a signal $y_i$ received by the UE i is defined as shown in Equation (1).

$$y_i = \sqrt{P_i}\, h_{i,i} x_i + \sum_{j=1, j \neq i}^{L} \sqrt{P_j}\, h_{j,i} x_j + n_i \quad (1)$$

In Equation (1), $x_i$ denotes an $N_i \times 1$ signal vector transmitted from the BS i to the UE i, and $P_i$ denotes the power used by the BS i. $h_{i,i}$ is a $1 \times N_i$ vector representing the channel between the BS i and the UE i, wherein the components of the vector are independent of each other and follow a normal distribution having a mean of 0 and a variance of 1. Also, $x_j$ denotes an $N_i \times 1$ signal vector transmitted from the BS j to the UE j, and $P_j$ denotes the power used by the BS j. $h_{j,i}$ is a $1 \times N_i$ vector representing the channel between the BS j and the UE i, wherein the components of the vector are independent of each other and follow a normal distribution having a mean of 0 and a variance of 1. $n_i$ is a vector representing a noise, wherein the components of the vector are independent of each other and follow a normal distribution having a variance of $\sigma_n^2$. That is, $$\sum_{j=1, j \neq i}^{L} \sqrt{P_j}\, h_{j,i} x_j$$

represents an interference received from another cell.

The TX signal $x_i$ is obtained by performing precoding by applying an $N_i \times 1$ precoding vector $w_i$ to a TX symbol $s_i$, which is expressed as shown in Equation (2).

$$x_i = w_i s_i \quad (2)$$

Also, when the precoding vector $w_i$ is applied, a Signal-to-Interference-plus-Noise Ratio (SINR) of the UE i is expressed as shown in Equation (3).

$$SINR_i = \frac{P_i \|h_{i,i} w_i\|^2}{\sigma_n^2 + \sum_{j=1, j \neq i}^{L} P_j \|h_{j,i} w_j\|^2} \quad (3)$$

As described above, because the wireless communication system is capable of multi-cell cooperation based on TDD, each BS can know the channel states between the BS and all relevant UEs based on the TDD channel reciprocity. Thus, the SLNR of a BS may be defined like the SLNR of a UE. That is, by using the size of a signal transmitted from the BS i to the UE i and the size of a noise and the size of an interference (leakage) from the transmitted signal to the UE j located in another cell, the SLNR of the BS i may be defined as shown in Equation (4).

$$SLNR_i = \frac{P_i \|h_{i,i} w_i\|^2}{\sigma_n^2 + \sum_{j=1, j \neq i}^{L} P_i \|h_{i,j} w_i\|^2} \quad (4)$$

In accordance with an embodiment of the present invention, a precoding vector is provided for reducing interference with another cell and transmitting a signal from each BS successfully. Also, a weight factor capable of controlling an interference with a UE with a good communication environment and an interference with a UE with a poor communication environment is reflected in determining the precoding vector, thereby improving the performance of the UE with a poor communication environment.

A precoding vector determined by a BS is determined based on a weight factor-based SLNR, unlike the conventional SLNR maximization scheme. Each BS measures the channel between a BS and a UE based on the reference signals received from all the UEs supported by the BS. Thereafter, the BS defines a Channel Quality Indicator (CQI) parameter indicating the channel state between a BS and a UE (e.g., a channel size) as shown in Equation (5) below and transmits the same to through the backhaul to the central unit 100.

$$\|h_{i,i}\|^2, i=1, \ldots, L \quad (5)$$

Therefore, in accordance with an embodiment of the present invention, only the minimum information of a channel size is shared (not all the channel components), thereby reducing the information sharing amount.

The central unit 100 determines a weight factor $\alpha_{i,j}$ for each BS by the CQI parameter of each cell received from each BS through the backhaul, and transmits the determined weight factor to each BS. Herein, the weight factor represents a relative ratio of an inter-cell environment that will be interfered by each BS. Each BS determines a weight-based SLNR based on the weight factor. For example, the weight-based SLNR may be defined as shown in Equation (6).

$$w-SLNR_i = \frac{P_i \|h_{i,i} w_i\|^2}{\sigma_n^2 + \sum_{j=1, j \neq i}^{L} \alpha_{i,j} P_i \|h_{i,j} w_i\|^2} \quad (6)$$

By using the weight-based SLNR, each BS may determine a precoding vector for controlling the size of a possible interference with the BS in consideration of the communication environment of an adjacent cell.

The weight factor of each BS determined by the central unit 100 based on the cell-by-cell CQI parameter may be determined using Equation (7).

$$\alpha_{i,j} = \frac{H}{\|h_{j,i}\|^2}, \, j=1, \cdots, L, \, j \neq i \quad (7)$$

In Equation (7), H denotes a harmonic mean of $\|h_{k,k}\|^2$, $k=1, \ldots, L, k \neq i$. When the weight is too large, the interference becomes large and the TX signal becomes small. Therefore, the harmonic mean is applied to satisfy the restriction of Equation (8).

$$\sum_{j=1, j\neq i}^{L} \alpha_{i,j} = L - 1 \quad (8)$$

In Equation (8), from the viewpoint of the BS i, $\alpha_{i,j}$ represents the ratio of the channel size between the BS j and the UE j to the channel size of other cells. That is, when having a better channel than other cells, its weight may be set to be small; and when having a poorer channel than other cells, its weight may be set to be large. When the weight is set to be large, the weight is given as if a larger interference was caused, as compared with a practical interference from the BS to a cell. Thus, when the precoding vector is set, the weight is set not to interfere with the relevant cell. The use of the weight-based SLNR makes it possible to effectively control interference, thereby securing performance of the UE with a poor communication environment.

Thereafter, each BS determines a precoding vector by selecting a precoding vector maximizing the weight-based SLNR as shown in Equation (9).

$$\max_{\|w_i\|^2 = 1} = \frac{P_i \|h_{i,i} w_i\|^2}{\sigma_n^2 + \sum_{j=1, j\neq i}^{L} \alpha_{i,j} P_i \|h_{i,j} w_i\|^2} \quad (9)$$

Figure 2:
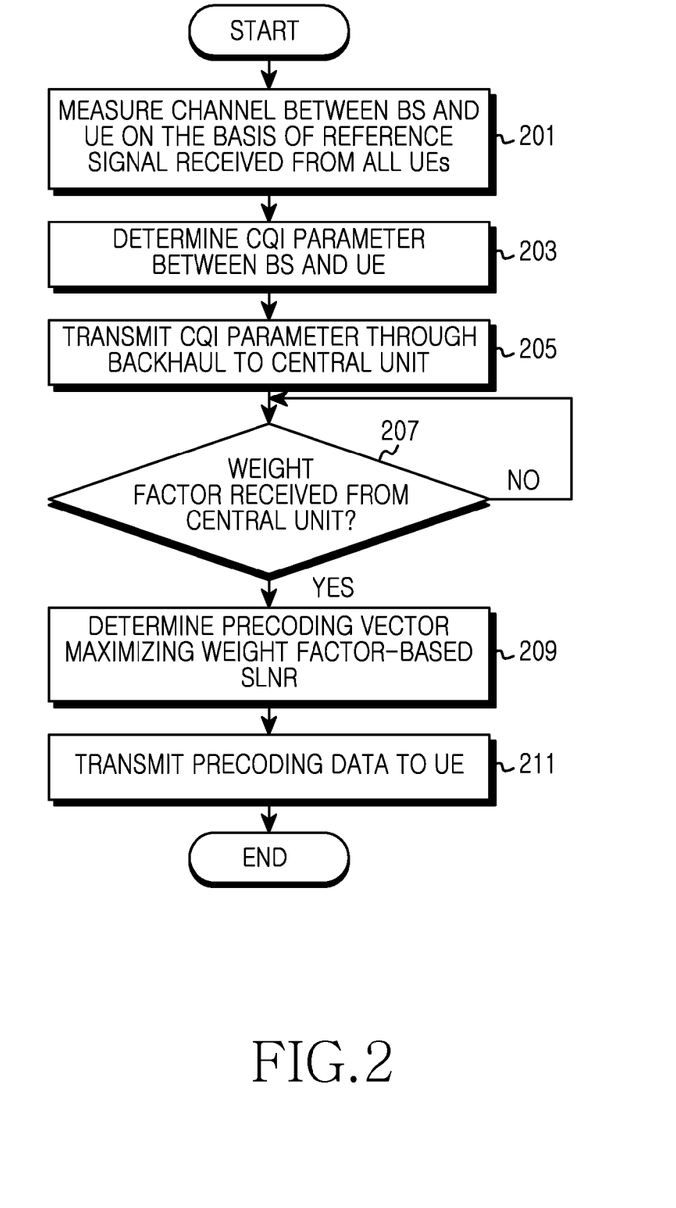
FIG. 2 is a flow diagram illustrating a BS method for precoding by limited inter-cell cooperation in a wireless communication system according to an embodiment of the present invention.

FIG. 2 is a flow diagram illustrating a BS method for precoding by limited inter-cell cooperation in a wireless communication system according to an embodiment of the present invention.

Referring to FIG. 2, in step 201, the BS measures a channel between the BS and a UE based on a reference signal received from all of the UEs in a network, which includes the BS.

In step 203, based on channel information between the BS and the UE obtained by measuring in step 201, the BS determines a CQI parameter indicating the channel state between the BS and the UE served by the BS (e.g., a channel size). Herein, the channel size may be determined as shown in Equation (5) above.

In step 205, the BS transmits the determined CQI parameter through a backhaul to a central unit.

In step 207, the BS determines whether a weight factor is received through the backhaul from the central unit. Herein, the weight factor represents the relative ratio of an inter-cell environment that will be interfered by the BS, which is determined by the central unit based on the CQI parameter transmitted from each BS through the backhaul to the central unit. As described above, the weight factor may be determined as shown in Equation (7).

When the weight factor is received through the backhaul from the central unit (in step 207), in step 209, the BS determines a precoding vector maximizing an SLNR based on the received weight factor, as shown in Equation (9) above.

In step 211, the BS precodes data of scheduled UEs by the determined precoding vector and transmits the precoding data to the relevant UEs.

Figure 3:
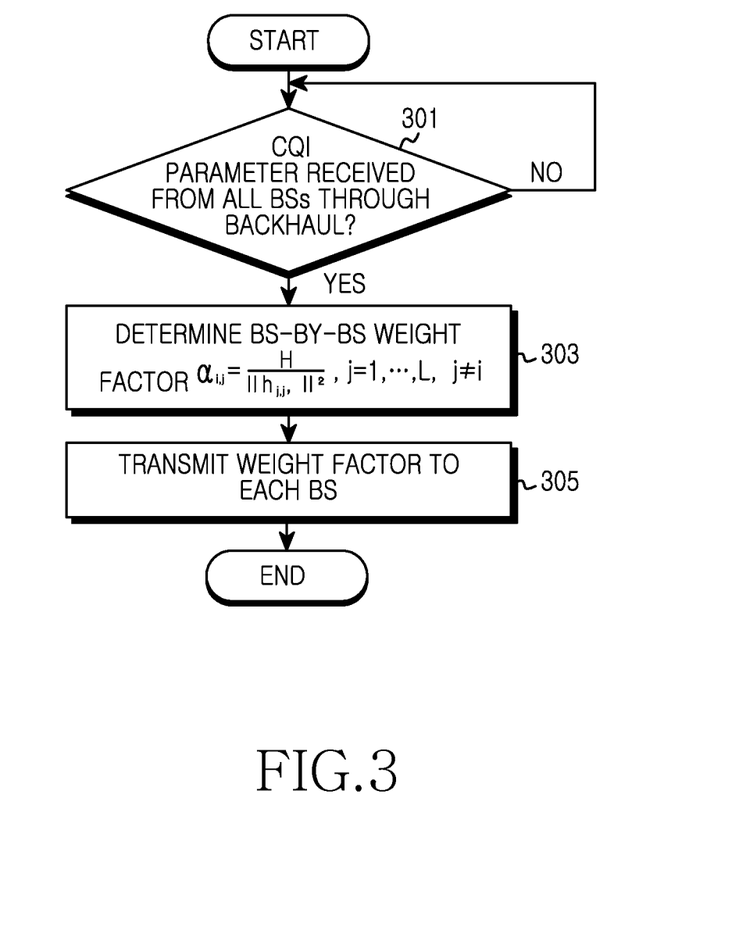
FIG. 3 is a flow diagram illustrating a method for precoding by limited inter-cell cooperation in a wireless communication system according to an embodiment of the present invention.

FIG. 3 is a flow diagram illustrating a central unit method for precoding by limited inter-cell cooperation in a wireless communication system according to an embodiment of the present invention.

Referring to FIG. 3, in step 301, the central unit determines whether a CQI parameter indicating the channel state between a BS and a UE served by the BS (e.g., a channel size) is received through a backhaul from all the BSs managed by the central unit. Herein, the channel size may be determined by each BS using Equation (5) above.

When the CQI parameter indicating the channel state between a BS and a UE served by the BS (e.g., a channel size) is received through the backhaul from the BSs managed by the central unit in step 301, in step 303, the central unit determines a BS-by-BS weight factor based on the BS-by-BS CQI parameter. Herein, the weight factor represents a relative ratio of an inter-cell environment that will be interfered by each BS, which may be determined as shown in Equation (7) above.

In step 305, the central unit transmits the determined weight factor through the backhaul to the each BS.

Figure 4:
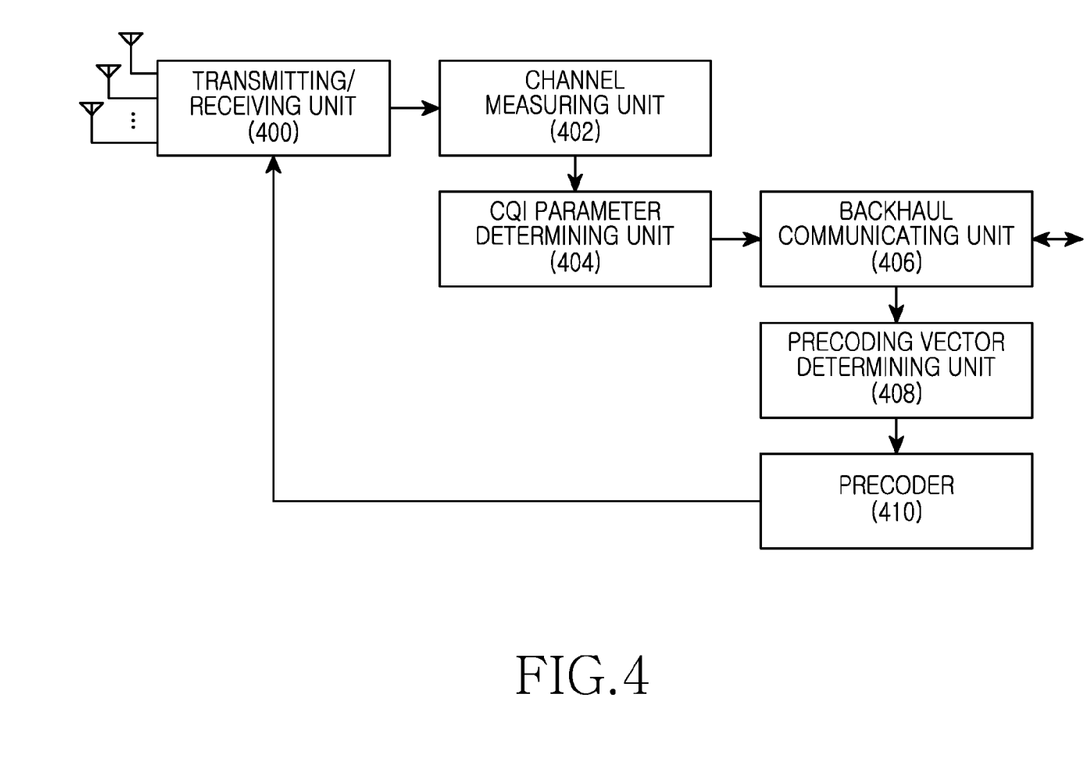
FIG. 4 illustrates a BS for precoding by limited inter-cell cooperation in a wireless communication system according to an embodiment of the present invention.

FIG. 4 illustrates a BS for precoding by limited inter-cell cooperation in a wireless communication system according to an embodiment of the present invention.

Referring to FIG. 4, the BS includes a transmitting/receiving unit 400, i.e., a transceiver, a channel measuring unit 402, a CQI parameter determining unit 404, a backhaul communicating unit 406, a precoding vector determining unit 408, and a precoder 410.

The transmitting/receiving unit 400 communicates signals with the UEs in a cell served by the BS. The channel measuring unit 402 measures a channel between the BS and a UE based on a reference signal received from the UEs in a network including the BS.

Based on channel information between the BS and the UE obtained by the above measurement, the CQI parameter determining unit 404 determines a CQI parameter indicating the channel state between the BS and the UE served by the BS (e.g., a channel size). Again, the channel size may be determined using Equation (5) above.

The backhaul communicating unit 406 communicates signals with the central unit through the backhaul. Specifically, the backhaul communicating unit 406 transmits a determined CQI parameter through the backhaul to the central unit, and receives a weight factor through the backhaul from the central unit. Herein, the weight factor represents the relative ratio of an inter-cell environment that will be interfered by the BS, which may be determined by the central unit as shown in Equation (7) above.

The precoding vector determining unit 408 determines a precoding vector maximizing an SLNR based on the received weight factor, as shown in Equation (9) above.

The precoder 410 precodes data of scheduled UEs by the determined precoding vector.

Figure 5:
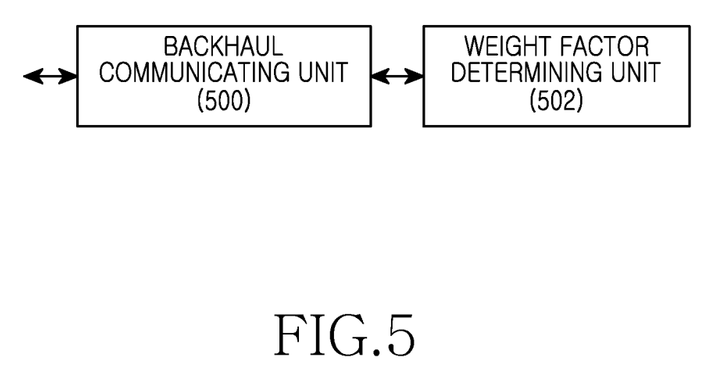
FIG. 5 illustrates a central unit for precoding by limited inter-cell cooperation in a wireless communication system according to an embodiment of the present invention.

FIG. 5 illustrates a central unit for precoding by limited inter-cell cooperation in a wireless communication system according to an embodiment of the present invention. For example, the central unit is a server.

Referring to FIG. 5, the central unit includes a backhaul communicating unit 500 and a weight factor determining unit 502.

The backhaul communicating unit 500 communicates signals through a backhaul with the BSs managed by the central unit. Specifically, the backhaul communicating unit 500 receives a CQI parameter, which indicates the channel state between a BS and a UE served by the BS (e.g., a channel size), through the backhaul from each of the BSs managed by the central unit, and transmits a determined weight factor through the backhaul to the BS.

The weight factor determining unit 502 determines a BS-by-BS weight factor based on the BS-by-BS CQI parameter. Herein, the weight factor represents the relative ratio of an inter-cell environment that will be interfered by each BS, which may be determined using Equation (7).

Figure 6:
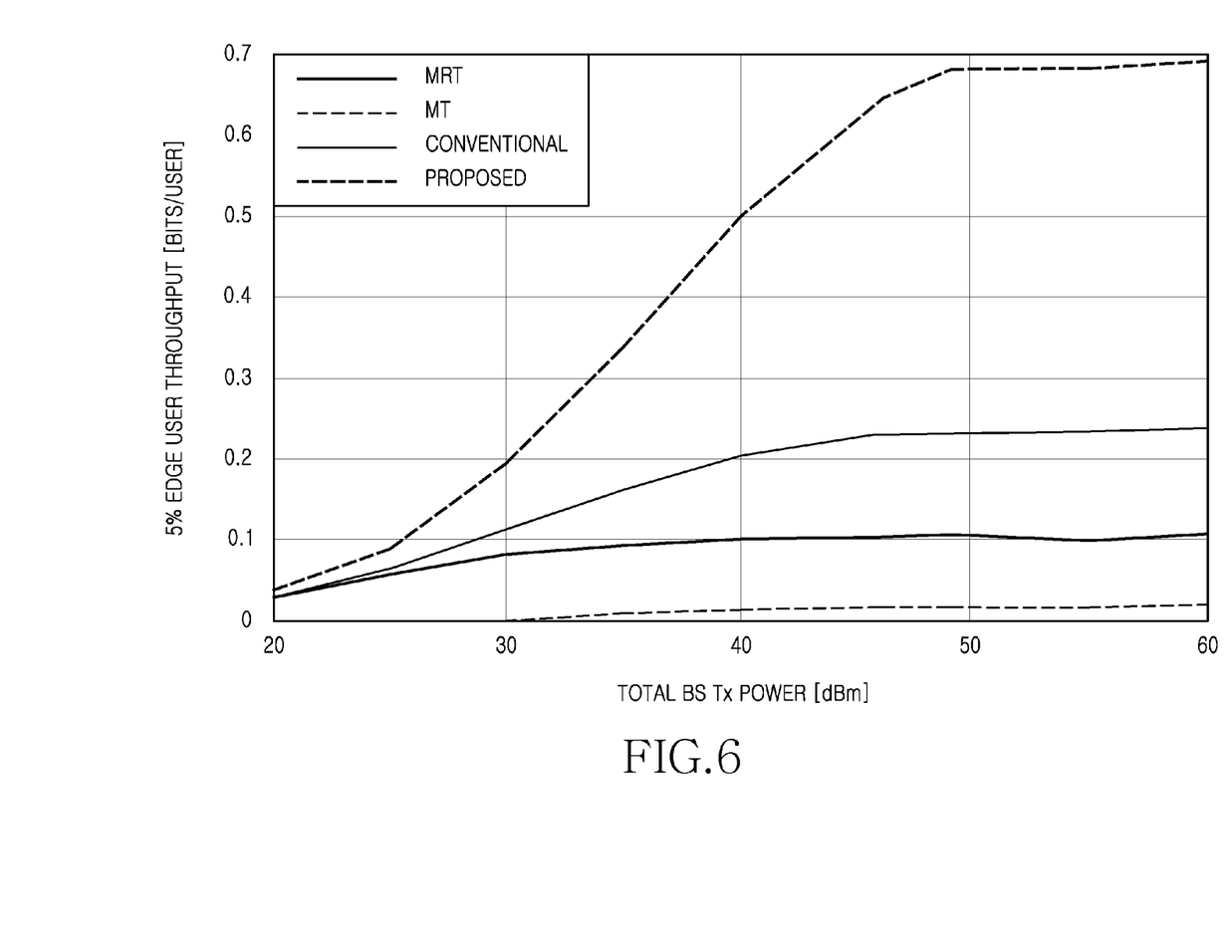
FIG. 6 is a graph illustrating a comparison between the performance of the present invention and the performance of conventional schemes.

FIG. 6 is a graph illustrating a comparison between the performance of the present invention and the performance of conventional schemes in terms of the average data rate of a 5% edge UE with respect to the TX power used by each BS.

Referring to FIG. 6, the comparative experiment environment includes 19 cells. In a TDD-based system environment, each BS supports one UE and has three antennas, and the UE has one antenna. Also, a $3^{rd}$ Generation Partnership Project (3GPP) Long Term Evolution (LTE) Software Configuration Manager (SCM) channel environment is used, and the radius of each cell is set to 500 m.

In this environment, a method in accordance with an embodiment of the present invention has approximately twice the performance of the conventional SLNR maximization scheme in terms of the average data rate of a 5% edge UE with respect to the TX power used by each BS. That is, as shown in FIG. 6, the weight factor in accordance with an embodiment of the present invention improves the UE with a poor communication environment.

Figure 7:
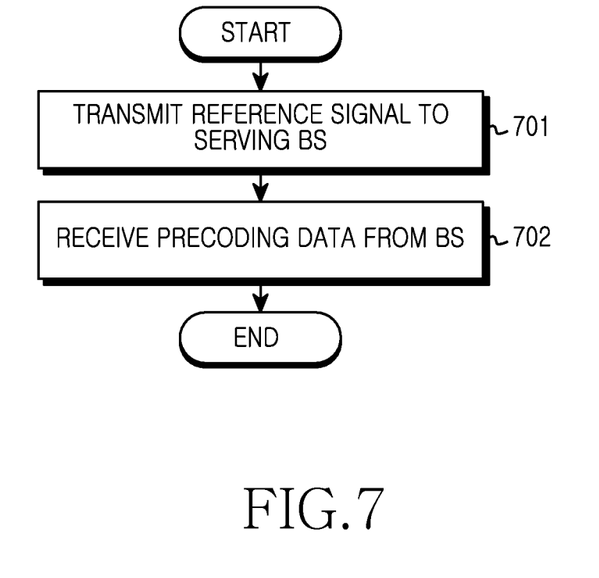
FIG. 7 is a flow diagram illustrating a UE method of receiving precoding data according to an embodiment of the present invention.

FIG. 7 is a flow diagram illustrating a UE method for receiving precoding data according to an embodiment of the present invention.

Referring to FIG. 7, in step 701, the UE transmits a reference signal to a BS serving the UE. Specifically, when the UE transmits a reference signal to a BS serving the UE, the BS receives the reference signal and measures a channel between the BS and the UE based on the received reference signal. Herein, the reference signal is set between the BS and the UE, and is transmitted from the UE to the BS at a predetermined location at a predetermined time.

In step 702, the UE receives precoding data from the BS serving the UE. Specifically, when the BS receives a weight factor through a backhaul from a central unit, it determines a precoding vector maximizing an SLNR based on the received weight factor. Thereafter, the BS precodes data of scheduled UEs by the determined precoding vector, and transmits the precoding data to the relevant UEs. Thus, the UE receives the precoding data from the BS. Herein, the precoding vector may be determined as shown in Equation (9).

Figure 8:
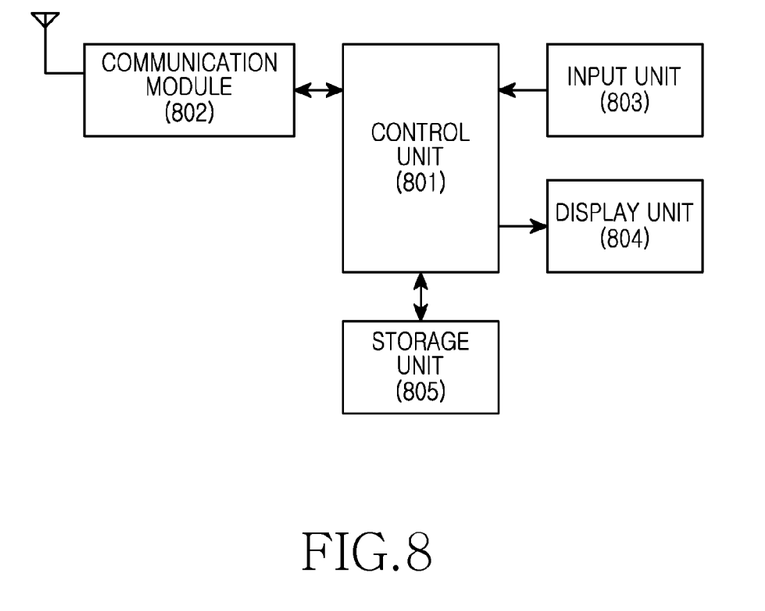
FIG. 8 illustrates a UE according to an embodiment of the present invention.

FIG. 8 illustrates a UE according to an embodiment of the present invention.

Referring to FIG. 8, the UE includes a control unit 801, a communication module 802, an input unit 803, a display unit 804, and a storage unit 805.

The control unit 801 controls an overall operation of the UE. The communication module 802 processes signals communicated through an antenna for voice and data communication. For example, the communication module 802 transmits a reference signal to a serving BS and receives precoding data from the serving BS.

The input unit 803 provides the control unit 802 with input data generated by a user. The display unit 804 displays information, menu screens, state information of the UE, etc., under the control of the control unit 801.

The storage unit 805 may include a program storing unit that stores a program for controlling the operation of the UE and a data storing unit that stores data generated during the execution of the program.

In the above configuration, the control unit 801 may perform an overall function of the UE.

Although separate units are provided for respective functions of the control unit 801, the control unit 801 may be configured to also perform all or some of the respective functions on behalf of such separate units.

While the present invention has been shown and described with reference to certain embodiments thereof, it will be understood by those skilled in the art that various changes in form and detail may be made therein without departing from the spirit and scope of the present invention as defined by the appended claims and their equivalents.

What is claimed is:

1. A method of data precoding by a Base Station (BS) in a wireless communication system, the method comprising:
   determining a Channel Quality Indicator (CQI) parameter indicating channel size information between the BS and a User Equipment (UE) served by the BS;
   transmitting the determined CQI parameter through a backhaul to a central unit;
   receiving, from the central unit, a weight factor based on a CQI parameter from each cell; and
   determining a precoding vector based on the weight factor,
   wherein the weight factor represents a relative ratio of a channel size between the BS and the UE to a channel size of other cells.

2. The method of claim 1, further comprising measuring a channel between the BS and the UE served by the BS, based on a reference signal received from UEs in a cell included in a network including the BS,
   wherein the CQI parameter is determined using:

$$\|h_{i,i}\|^2, i=1,\ldots,L,$$

where $h_{i,i}$ is a vector representing a channel between a BS i and a UE i, and L denotes a total number of cells.

3. The method of claim 1, wherein the weight factor is determined using:

$$\alpha_{i,j} = \frac{H}{\|h_{j,j}\|^2}, j=1,\cdots,L, j \neq i,$$

where $a_{i,j}$ denotes a ratio of a channel size between a BS j and a UE j to a channel size of other cells from a viewpoint of a BS i, $h_{j,j}$ is a vector representing a channel between the BS j and the UEj, L denotes a total number of cells, and H denotes a harmonic mean of $\|h_{k,k}\|^2$, k=1, ..., L, k≈i.

4. The method of claim 1, wherein determining the precoding vector comprises selecting a precoding vector maximizing a Signal-to-Leakage-plus-Noise Ratio (SLNR) based on the weight factor using:

$$\max_{\|w_i\|^2=1} \frac{P_i\|h_{i,i}w_i\|^2}{\sigma_n^2 + \sum_{j=1,j\neq i}^{L} \alpha_{i,j}P_i\|h_{i,j}w_i\|^2},$$

where $w_i$ denotes a precoding vector used by a BS i, $P_i$ denotes a power used by the BS I, $h_{i,i}$ denotes a channel between the BS i and a UE i, $h_{j,i}$ denotes a channel between a BS j and the UE i, $\sigma_n^2$ denotes a noise variance, $a_{i,j}$ denotes a ratio of a channel size between the BS j and a UE j to a channel size of other cells from a viewpoint of the BS i, and L denotes a total number of cells.

5. A method of data precoding by a central unit in a wireless communication system, the method comprising:
   receiving a Channel Quality Indicator (CQI) parameter through a backhaul from each cell in the wireless communication system;
   determining a cell-by-cell weight factor based on the received CQI parameters from each cell; and transmitting the cell-by-cell weight factor through a backhaul to a relevant cell,
wherein the weight factor represents a relative ratio of a channel size between a Base Station (BS) and a User Equipment (UE) to a channel size of other cells.

6. The method of claim 5, wherein the CQI parameter is determined by each cell using:

$$\|h_{i,i}\|^2, i=1,\ldots,L,$$

where $h_{i,i}$ is a vector representing a channel between a BS i and a UE i, and L denotes a total number of cells.

7. The method of claim 5, wherein the weight factor is determined using:

$$\alpha_{i,j} = \frac{H}{\|h_{j,j}\|^2}, j = 1, \cdots, L, j \neq i,$$

where $a_{i,j}$ denotes a ratio of a channel size between a BS j and a UE j to a channel size of other cells from a viewpoint of a BS i, $h_{j,j}$ is a vector representing a channel between the BS j and the UE j, L denotes a total number of cells, and H denotes a harmonic mean of $\|h_{k,k}\|^2$, k=1, ..., L, k≈i.

8. An apparatus of a Base Station (BS) for data precoding in a wireless communication system, the apparatus comprising:
a Channel Quality Indicator (CQI) parameter determining unit for determining a CQI parameter indicating channel size information between the BS and a User Equipment (UE) served by the BS;
a backhaul communicating unit for transmitting the CQI parameter through a backhaul to a central unit, and receiving, from the central unit, a weight factor based on a CQI parameter from each cell; and
a precoding vector determining unit for determining a precoding vector based on the weight factor,
wherein the weight factor represents a relative ratio of a channel size between the BS and the UE to a channel size of other cells.

9. The apparatus of claim 8, further comprising:
a channel measuring unit for measuring a channel between the BS and the UE served by the BS, based on a reference signal received from each UE in a cell included in a network including the BS,
wherein the CQI parameter is determined using:

$$\|h_{i,i}\|^2, i=1,\ldots,L,$$

where $h_{i,i}$ is a vector representing a channel between a BS i and a UE i, and L denotes a total number of cells.

10. The apparatus of claim 8, wherein the weight factor is determined using:

$$\alpha_{i,j} = \frac{H}{\|h_{j,j}\|^2}, j = 1, \cdots, L, j \neq i,$$

where $a_{i,j}$ denotes a ratio of a channel size between a BS j and a UE j to a channel size of other cells from a viewpoint of a BS i, $h_{j,j}$ is a vector representing a channel between the BS j and the UE j, L denotes a total number of cells, and H denotes a harmonic mean of $\|h_{k,k}\|^2$, k=1, ..., L, k≈i.

11. The apparatus of claim 8, wherein the precoding vector is determined by selecting a precoding vector maximizing a Signal-to-Leakage-plus-Noise Ratio (SLNR) based on the weight factor using:

$$\max_{\|w_i\|^2=1} \frac{P_i\|h_{i,i}w_i\|^2}{\sigma_n^2 + \sum_{j=1,j\neq i}^{L} \alpha_{i,j}P_i\|h_{i,j}w_i\|^2},$$

where $w_i$ denotes a precoding vector used by a BS i, $P_i$ denotes a power used by the BS i, $h_{i,i}$ denotes a channel between the BS i and a UE i, $h_{i,j}$ denotes a channel between a BS j and the UE i, $\sigma_n^2$ denotes a noise variance, $a_{i,j}$ denotes a ratio of a channel size between the BS j and a UE j to a channel size of other cells from a viewpoint of the BS i, and L denotes the total number of cells.

12. An apparatus of a central unit for data precoding in a wireless communication system, the apparatus comprising:
a backhaul communicating unit for receiving a Channel Quality Indicator (CQI) parameter through a backhaul from each cell, and transmitting a determined cell-by-cell weight factor through the backhaul to a relevant cell; and
a weight factor determining unit for determining the cell-by-cell weight factor based on the received CQI parameters,
wherein the weight factor represents a relative ratio of a channel size between a Base Station (BS) and a User Equipment (UE) to a channel size of other cells.

13. The apparatus of claim 12, wherein the CQI parameter is determined by each cell using:

$$\|h_{i,i}\|^2, i=1,\ldots,L,$$

where $h_{i,i}$ is a vector representing a channel between a BS i and a UE i, and L denotes the total number of cells.

14. The apparatus of claim 12, wherein the weight factor is determined using:

$$\alpha_{i,j} = \frac{H}{\|h_{j,j}\|^2}, j = 1, \cdots, L, j \neq i,$$

where $a_{i,j}$ denotes a ratio of a channel size between a BS j and a UE j to a channel size of other cells from a viewpoint of a BS i, $h_{j,j}$ is a vector representing a channel between the BS j and the UE j, L denotes a total number of cells, and H denotes a harmonic mean of $\|h_{k,k}\|^2$, k=1, ..., L, k≈i.

* * * * *